J. CROSS.
Faucet.
No. 10,633.
Patented March 14, 1854.
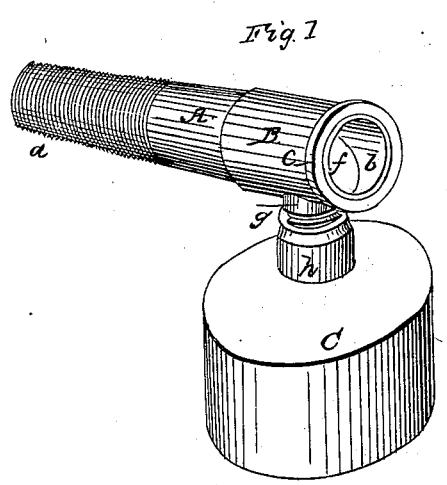
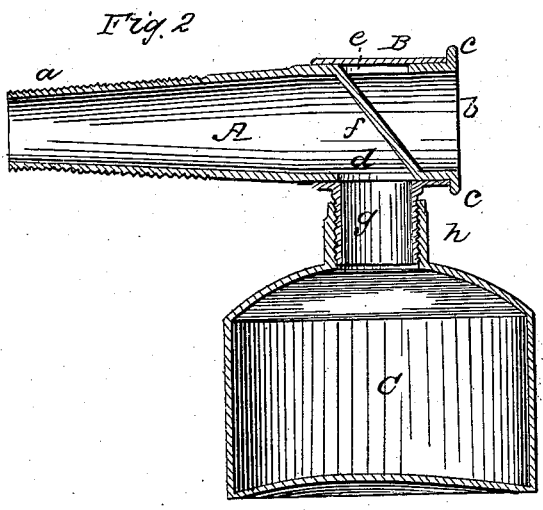
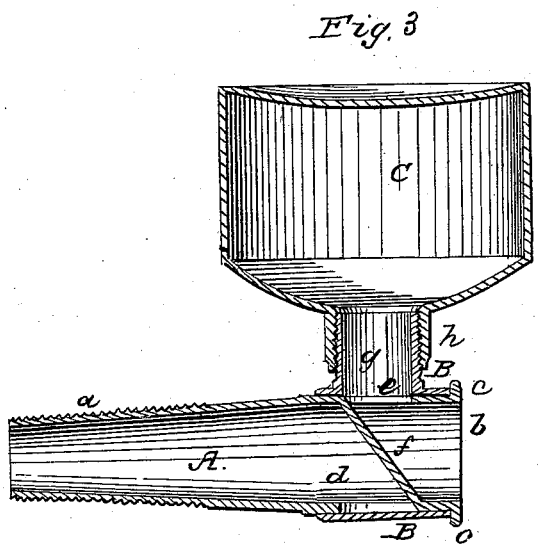

UNITED STATES PATENT OFFICE.

JOSHUA CROSS, OF NEW LONDON, OHIO.

FAUCET FOR MEASURING LIQUIDS.

Specification of Letters Patent No. 10,633, dated March 14, 1854.

*To all whom it may concern:*

Be it known that I, JOSHUA CROSS, of New London, in the county of Huron and State of Ohio, have invented certain new and useful Improvements in Self-Measuring Faucets, of which the following is a full, clear, and exact description, reference being had to the accompanying drawing, which forms part of this specification, and in which—

Figure 1 represents a view in perspective of a faucet embracing my improvements; Fig. 2, a vertical longitudinal section of the same showing the measure in position to be filled; and Fig. 3 a similar view but showing the measure in position to discharge its contents.

My invention and improvements consist in combining a measuring vessel with the valve of a faucet, in such manner, that when the former is turned into one position it shall be in free communication with the interior of a barrel, or other vessel whose contents are to be discharged and measured, and on being turned in another, the communication with the barrel shall be cut off and the measure emptied.

In the accompanying drawing A represents the stem or shank of a faucet suitable to carry my improvements into effect; its shape being that of the frustra of two hollow cones united at their base. On the inner end ($a$) of the stem a thread may be cut for the purpose of screwing it into the tap hole of the barrel or cask. On the outer end ($b$) a thread is also cut on which a nut ($c$) is fitted. In the end $b$, two apertures ($d$ and $e$) are made, diametrically opposite to each other and of similar form and size, but separated from each other by a diaphragm ($f$) passing diagonally between them, and dividing the stem into two chambers, into one of which the aperture $d$ opens, while the aperture $e$ opens into the other.

On the outer end ($b$) of the shank a sleeve (B) is fitted; this sleeve is held on the stem, and adjusted to the requisite degree of tightness by the nut or flange ($c$) on the end of the shank. This sleeve has an opening in it communicating with a tubular stem ($g$) on the exterior of which a screw is cut, which takes into a corresponding screw in the neck ($h$) of a measuring vessel (C). The opening in the tube corresponds in form, position, and size to the openings ($d$ and $e$) in the sides of the shank.

The measuring vessel (C) may be of any suitable shape, and of any desired capacity; and by screwing its neck ($h$) to the stem ($g$) it is secured to the faucet. This arrangement enables the attendant, when the measure atached to the faucet is not of the desired size, to remove it and replace it by another of the required capacity. The sleeve (B) it will be seen performs the function of a valve in the faucet.

When this faucet is inserted in a barrel or other vessel for the purpose of drawing off and measuring its contents, its shank must be turned until the aperture $d$ rests in the position seen in Figs. 2 and 3, when, by turning the sleeve or valve (B) with the measure (C) till the latter is in a vertical position beneath the shank, the opening in the tube ($g$) will be opposite to the aperture $d$ in the inner chamber, that communicates with the barrel, and after being allowed to remain in that position a length of time sufficient for the measure to be filled, it is again turned, until its position is reversed, or in a position above the shank as seen in Fig. 3, when the opening in the tube ($g$) will be placed opposite the aperture $e$, in the outer chamber, by which operation the measure will have been accurately and exactly filled, and its contents discharged through the aperture $e$, when it may be reversed to its former position to be again filled and discharged.

The measure may be of any desired size, or each faucet may have a set of measures of different capacities.

My improved faucet is peculiarly adapted to the measuring of such fluids as are of an inflammable or explosive nature when drawn off at night, as it can be measured as well in the dark as in the light; and is well calculated to prevent loss by leakage, through the carelessness of attendants, leaving the cock open, as it is impossible for it to be placed in such a position that the contents of a barrel could run off through it. And in addition to this the measuring will be effected without either danger of waste, or loss of time.

If it should be found necessary, in drawing and measuring viscous fluids, to open a vent in the measure, it can readily be done by withdrawing a plug, or turning a cock fitted to it for the purpose, in any of the known ways of applying such a device to vessels.

Having thus described my improved measuring faucet, what I claim as new and desire to secure by Letters Patent is—

The construction and arrangement of a measuring vessel and the valve of a faucet, substantially as herein described.

In testimony whereof, I have hereunto subscribed my name.

JOSHUA CROSS.

Witnesses:
A. McCLELLAN,
J. S. SMURR.